United States Patent
Dolman et al.

(10) Patent No.: US 11,549,399 B2
(45) Date of Patent: Jan. 10, 2023

(54) CONTROLLING LUBRICANT FLOW IN EPICYCLIC GEARBOX

(71) Applicant: Raytheon Technologies Corporation, Farmington, CT (US)

(72) Inventors: Paul H. Dolman, Simsbury, CT (US); Michael E. McCune, Colchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/676,520

(22) Filed: Feb. 21, 2022

(65) Prior Publication Data
US 2022/0178275 A1   Jun. 9, 2022

Related U.S. Application Data

(63) Continuation of application No. 16/590,666, filed on Oct. 2, 2019, now Pat. No. 11,280,221, which is a continuation of application No. 15/022,688, filed as application No. PCT/US2014/056438 on Sep. 19, 2014, now Pat. No. 10,436,067.
(Continued)

(51) Int. Cl.
| | |
|---|---|
| F01D 25/20 | (2006.01) |
| F16H 57/04 | (2010.01) |
| F02C 7/36 | (2006.01) |
| F01M 11/06 | (2006.01) |
| F01M 1/12 | (2006.01) |
| F16N 7/40 | (2006.01) |

(52) U.S. Cl.
CPC ......... *F01D 25/20* (2013.01); *F16H 57/0475* (2013.01); *F01M 11/067* (2013.01); *F01M 2001/123* (2013.01); *F01M 2001/126* (2013.01); *F02C 7/36* (2013.01); *F05D 2220/32* (2013.01); *F05D 2260/98* (2013.01); *F16H 57/04* (2013.01); *F16N 7/40* (2013.01)

(58) Field of Classification Search
CPC ................. F01D 25/20; F01M 11/067; F01M 2001/123; F01M 2001/126; F02C 7/06; F02C 7/36; F05D 2260/98; F16H 57/0475; F16N 9/00
See application file for complete search history.

(56) References Cited

U.S. PATENT DOCUMENTS

| | | |
|---|---|---|
| 2,669,094 A | 2/1954 | Lee, II |
| 2,991,845 A | 7/1961 | Scheffler, Jr. |
| | (Continued) | |

OTHER PUBLICATIONS

International Search Report and Written Opinion for International Application No. PCT/US2014/056438 dated Dec. 26, 2014.
(Continued)

*Primary Examiner* — Scott J Walthour
(74) *Attorney, Agent, or Firm* — Carlson, Gaskey & Olds, P.C.

(57) ABSTRACT

A disclosed lubrication system for a turbofan engine includes a pump for driving lubricant through a lubrication circuit, at least one sensor generating a signal indicative of an engine operating condition and at least one valve for controlling a flow of lubricant through the lubrication circuit. A controller controls operation of the valve to vary the flow of lubricant based on the engine operating condition to maintain lubricant flow within predefined operating limits.

17 Claims, 3 Drawing Sheets

Related U.S. Application Data

(60) Provisional application No. 61/882,791, filed on Sep. 26, 2013.

(56) References Cited

U.S. PATENT DOCUMENTS

| | | |
|---|---|---|
| 4,569,196 A | 2/1986 | Waddington et al. |
| 4,741,152 A | 5/1988 | Burr et al. |
| 5,067,454 A | 11/1991 | Waddington et al. |
| 5,180,034 A | 1/1993 | Lopes |
| 5,394,689 A | 3/1995 | D'Onofrio |
| 6,058,694 A | 5/2000 | Ackerman et al. |
| 7,506,724 B2 | 3/2009 | Delaloye |
| 8,230,974 B2 | 7/2012 | Parnin |
| 8,261,527 B1 | 9/2012 | Stearns et al. |
| 8,443,582 B1 | 5/2013 | Phillips et al. |
| 8,473,176 B2 | 6/2013 | Youngquist et al. |
| 8,495,857 B2 | 7/2013 | Papa et al. |
| 2001/0047647 A1 | 12/2001 | Cornet |
| 2004/0255656 A1 | 12/2004 | Rafei |
| 2006/0081419 A1 | 4/2006 | Care et al. |
| 2008/0110596 A1 | 5/2008 | Schwarz et al. |
| 2008/0116010 A1 | 5/2008 | Portlock et al. |
| 2011/0168495 A1 | 7/2011 | Subramaniam et al. |
| 2013/0047624 A1 | 2/2013 | Suciu et al. |

OTHER PUBLICATIONS

International Preliminary Report on Patentability for International Application No. PCT/US2014/056438 dated Apr. 7, 2016.
European Search Report for EP Application No. 14848151.8 dated Sep. 26, 2016.

CONTROLLING LUBRICANT FLOW IN EPICYCLIC GEARBOX

CROSS REFERENCE TO RELATED APPLICATION

This application is a continuation of U.S. patent application Ser. No. 16/590,666 filed on Oct. 2, 2019, which is a continuation of U.S. patent application Ser. No. 15/022,688 filed on Mar. 17, 2016 now U.S. Pat. No. 10,436,067 issued on Oct. 8, 2019, which is a National Phase of International Patent Application No. PCT/US2014/056438 filed on Sep. 19, 2014, which claims priority to U.S. Provisional Application No. 61/882,791 filed on Sep. 26, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes first and second compressor sections, and the turbine section includes first and second turbine sections.

A speed reduction device such as an epicyclical gear assembly may be utilized to drive the fan section such that the fan section may rotate at a speed different than the turbine section so as to increase the overall propulsive efficiency of the engine. In such engine architectures, a shaft driven by one of the turbine sections provides an input to the epicyclical gear assembly that drives the fan section at a reduced speed such that both the turbine section and the fan section can rotate at closer to optimal speeds.

Lubrication systems for turbine engines are typically sized and operated to continually provide a minimum level of lubricant flow and pressure to the various structures and portions of the engine. The minimum level of lubricant flow and pressure is typically based on maximum lubricant demand conditions such as during maximum thrust conditions during take-off. Other operating conditions may not require lubricant at such high levels of lubricant pressure and flows. Excess lubricant flow can reduce efficiency and insufficient lubricant flow and pressure can increase wear on components.

Although geared architectures have improved propulsive efficiency, turbine engine manufacturers continue to seek further improvements to engine performance including improvements to thermal, transfer and propulsive efficiencies.

SUMMARY

A lubrication system for a turbofan engine, according to an exemplary embodiment of this disclosure, among other possible things includes a pump for driving lubricant through a lubrication circuit, at least one sensor for generating a signal indicative of an engine operating condition, at least one valve for controlling a flow of lubricant through the lubrication circuit, and a controller for controlling operation of the valve to vary the flow of lubricant based on the engine operating condition.

In a further embodiment of the above, the engine operating condition comprises horsepower generated by at least one turbine section.

In a further embodiment of any of the above, wherein the controller is configured to vary the flow of lubricant to a speed reduction system.

In a further embodiment of any of the above, at least one sensor comprises a first sensor for generating a signal indicative of a pressure within a compressor section, a second sensor for generating a signal indicative of rotor speed, and a third sensor for generating a signal indicative of altitude.

In a further embodiment of any of the above, the compressor section comprises a high-pressure compressor and a low-pressure compressor and the first sensor generates a signal indicative of a pressure proximate an exit of the high-pressure compressor.

In a further embodiment of any of the above, the controller generates commands that control the valve to vary the flow of lubricant to a speed change device for engine conditions between Sea Level Takeoff Thrust and a cruise condition.

In a further embodiment of any of the above, the controller is configured to control the valve to vary a lubricant flow parameter of pounds of lubricant flow/hour/horsepower produced by a turbine section that drives a speed change device in response to an engine power setting.

A method of operating a turbofan engine, according to an exemplary embodiment of this disclosure, among other possible things includes determining a plurality of desired lubricant flow rates to a speed change device for a corresponding plurality of engine power settings, generating a signal indicative of an engine power setting, and varying lubricant flow to the speed change device based on the determined plurality of desired lubricant flow rates.

In a further embodiment of the above method, the plurality of desired lubricant flow rates comprises a flow parameter of pounds lubricant/hour/horsepower applied to the speed change device.

In a further embodiment of any of the above methods includes generating a signal indicative of an engine power setting comprises sensing at least one of a pressure within a compressor exit section, a speed of a shaft, and an altitude.

In a further embodiment of any of the above methods, the compressor section includes a high-pressure compressor and a low-pressure compressor and the pressure is sensed at an exit of the high-pressure compressor.

In a further embodiment of any of the above methods includes determining horsepower transmitted to the speed change device.

In a further embodiment of any of the above methods includes controlling a valve to vary lubricant flow to the speed change device.

In a further embodiment of any of the above methods wherein generating a signal indicative of an engine power setting includes sensing at least two of a pressure within a compressor exit section, a speed of a shaft and an altitude.

A turbofan engine, according to an exemplary embodiment of this disclosure, among other possible things includes a fan including a plurality of fan blades rotatable about an axis, a turbine section, a geared architecture configured to be driven by the turbine section for rotating the fan about the axis, a lubrication system for supplying a flow of lubricant to the geared architecture, at least one sensor for generating a signal indicative of an engine operating condition, at least one valve for controlling a flow of lubricant through the lubrication circuit, and a controller for controlling operation of the valve to vary the flow of lubricant to the geared architecture based on the engine operating condition.

In a further embodiment of the above, the engine operating condition comprises of horsepower generated by the turbine section for driving the geared architecture.

In a further embodiment of any of the above, at least one sensor comprises a first sensor for generating a signal indicative of a pressure within a compressor exit section, a second sensor for generating a signal indicative of rotor speed, and a third sensor for generating a signal indicative of altitude.

In a further embodiment of any of the above, the compressor section comprises a high-pressure compressor and a low-pressure compressor and the first sensor is configured to generate a signal indicative of a pressure proximate an exit of the high-pressure compressor.

In a further embodiment of any of the above, the controller is configured to control the valve to vary the flow of lubricant to the geared architecture for engine operating conditions between Sea Level Takeoff Thrust and a cruise condition.

In a further embodiment of any of the above, the controller is configured to control the valve to vary a lubricant flow parameter of pounds of lubricant flow/hour/horsepower produced by the turbine section that drives the geared architecture based on the engine operating condition.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
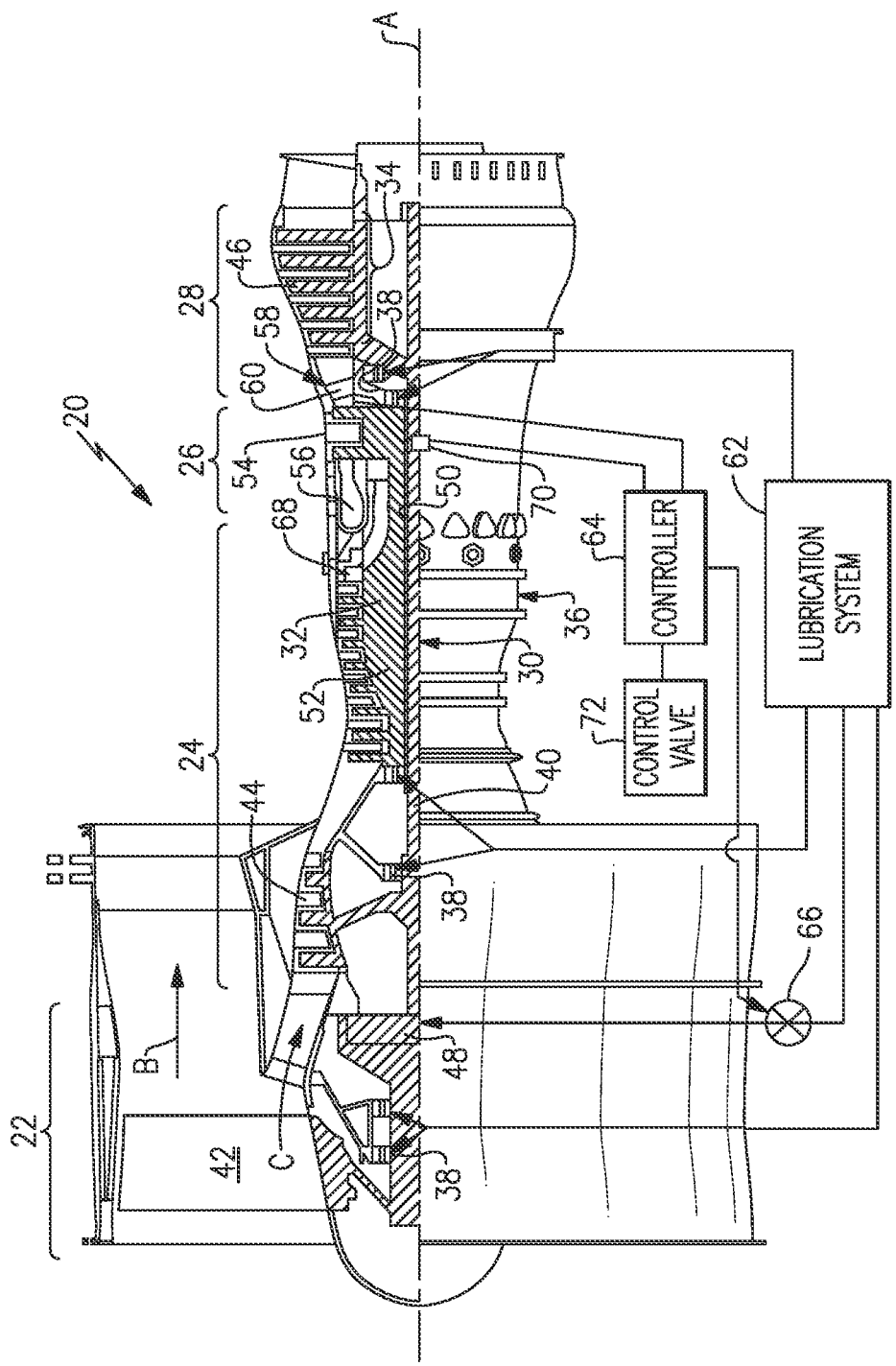
FIG. 1 is a schematic view of an example gas turbine engine.

FIG. 1 schematically illustrates an example turbofan gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high-pressure exhaust gas stream that expands through the turbine section 28 where energy is extracted and utilized to drive the fan section 22 and the compressor section 24.

Although the disclosed non-limiting embodiment depicts a two-spool turbofan gas turbine engine, it should be understood that the concepts described herein are not limited to use with two-spool turbofans as the teachings may be applied to other types of turbine engines; for example a turbine engine including a three-spool architecture in which three spools concentrically rotate about a common axis and where a low spool enables a first (or low) pressure turbine to drive a fan via a gearbox, a second (or intermediate) spool that enables a second (or intermediate) pressure turbine to drive a first compressor of the compressor section, and a third (or high) spool that enables a third (or high) pressure turbine to drive a second (or high) pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high-pressure compressor 52 and the high-pressure turbine 54. In one example, the high-pressure turbine 54 includes at least two stages to provide a double stage high-pressure turbine 54. In another example, the high-pressure turbine 54 includes only a single stage. As used herein, a "high pressure" compressor or turbine experiences a higher pressure than a corresponding "low pressure" compressor or turbine.

The example low-pressure turbine 46 has a pressure ratio that is greater than about 5. The pressure ratio of the example low-pressure turbine 46 is measured prior to an inlet of the low-pressure turbine 46 as related to the pressure measured at the outlet of the low-pressure turbine 46 prior to an exhaust nozzle.

A mid-turbine frame 58 of the engine static structure 36 is arranged generally between the high-pressure turbine 54 and the low-pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low-pressure turbine 46. Utilizing the vane 60 of the mid-turbine frame 58 as the inlet guide vane for low-pressure turbine 46 decreases the length of the low-pressure turbine 46 without increasing the axial length of the mid-turbine frame 58. Reducing or eliminating the number of vanes in the low-pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low-pressure compressor 44. It should be understood, however, that the above parameters are only exemplary of one embodiment of a gas turbine engine including a geared architecture and that the present disclosure is applicable to other gas turbine engines.

A significant amount of thrust is provided by airflow through the bypass flow path B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point. The maximum thrust may be Sea Level Takeoff Thrust "SLTO thrust" which is commonly defined as the flat-rated static thrust produced by the turbofan at sea-level "Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment, the low fan pressure ratio is less than about 1.45.

"Low corrected fan tip speed" is the actual fan tip speed in ft/sec divided by an industry standard temperature correction of $[(Tram\ °\ R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low-pressure turbine 46 includes no more than about six (6) turbine rotors schematically indicated at 34. In another non-limiting example embodiment, the low-pressure turbine 46 includes about three (3) turbine rotors. A ratio between the number of fan blades 42 and the number of low-pressure turbine rotors is between about 3.3 and about 8.6. The example low-pressure turbine 46 provides the driving power to rotate the fan section 22 and therefore the relationship between the number of turbine rotors 34 in the low-pressure turbine 46 and the number of blades 42 in the fan section 22 discloses an example gas turbine engine 20 with increased power transfer efficiency.

A lubrication system 62 provides lubricant flow to various features of the example turbine engine 20. The example lubrication system 62 supplies lubricant to the various bearing assemblies 38 along with the geared architecture 48. A controller 64 controls operation and flow of lubricant to the geared architecture 48 by controlling a valve 66. The valve 66 varies flow of lubricant depending on a current operating condition of the engine 20. The controller 64 determines the operating condition of the engine 20 by way of at least one sensor. In this example, the sensor includes a first sensor 68 that senses a pressure at an exit end of the high pressure compressor 52, a second sensor 70 disposed to generate a signal that is indicative of a rotational speed of the low pressure turbine 46, and a third sensor 72 that generates a signal indicative of altitude.

The information relating to the pressure, the rotor speed and altitude is utilized to determine a horsepower input into the geared architecture 48. The controller 64 commands the valve 66 to vary lubricant flow to the geared architecture 48 based on the determined horsepower.

Figure 2:
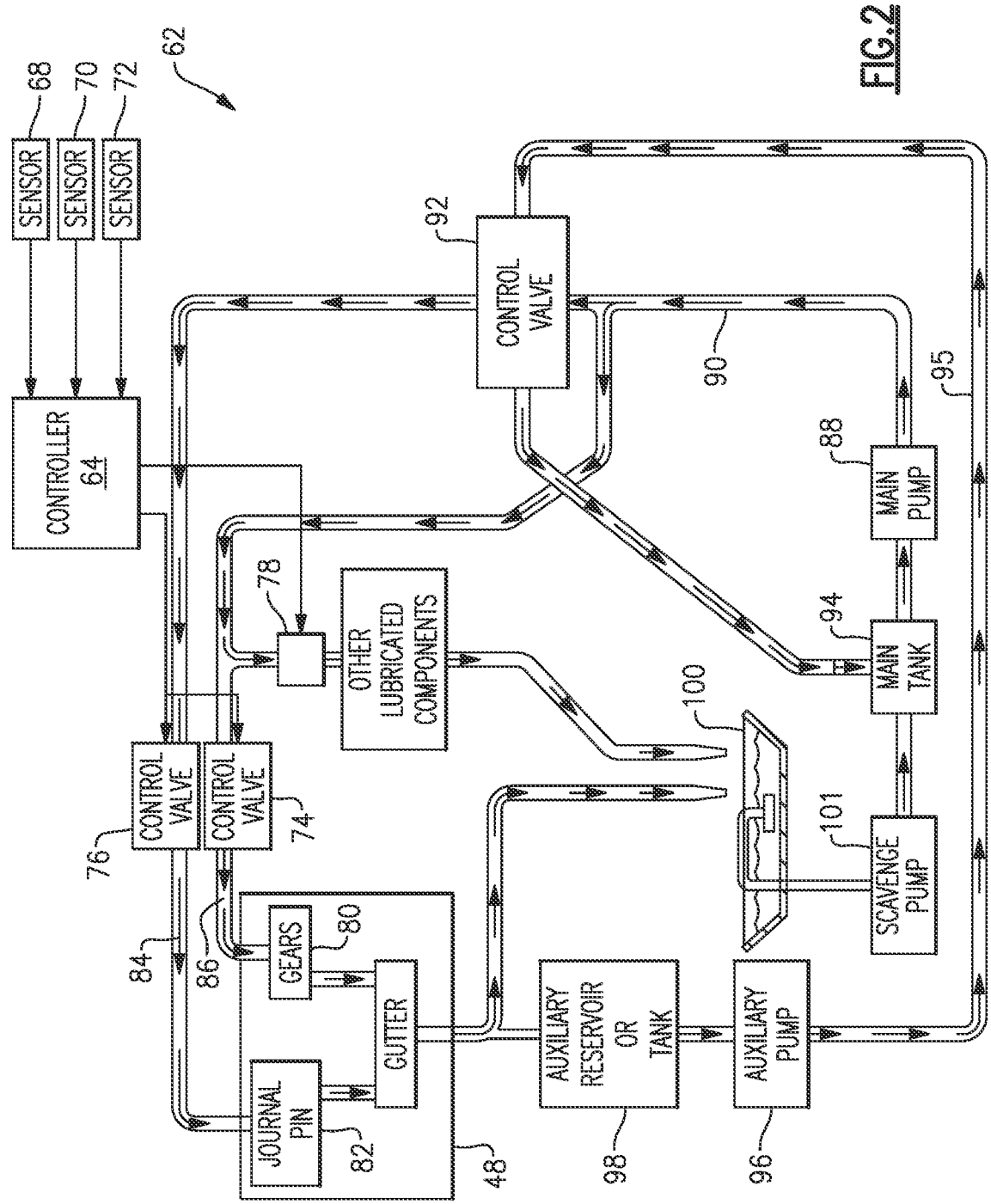
FIG. 2 is a schematic view of an example lubrication system.

Referring to FIG. 2, with continued reference to FIG. 1, the example lubrication system 62 provides for the varying of lubricant flow to the geared architecture 48 to provide an efficient flow of lubrication depending on the specific operating conditions of the engine 20.

The example lubrication system 62 includes a main pump 88 that draws lubricant from a main tank 94 and drives that lubricant through a primary circuit 90. An auxiliary pump 96 draws lubricant from an auxiliary reservoir 98 and supplies that additional lubricant back to the main tank 94 through control valve 92 under normal operation. When control valve 92 senses a loss of main oil pressure in primary circuit 90 it redirects flow from auxiliary pump 96 to primary circuit 90. A sump 100 and scavenge pump 101 recover lubricant and directs it back to the main tank 94.

A control valve 92 is provided between the auxiliary pump 96 and the main oil tank 94 to control the supply of lubricant returning to the primary circuit 90 depending on the pressure within primary circuit 90.

In this example, the geared architecture 48 includes a plurality of gears 80 that are supported by bearings 82. In this example, the bearings 82 are journal bearings and may also be of any other bearing configuration utilized to support rotation of the gears 80.

The controller 64 controls at least one valve 66 (FIG. 1) to control and modulate a flow of lubricant to the geared architecture 48. In this example, the controller 64 controls a first control valve 76 and a second control valve 74. The second control valve 74 supplies lubricant to the gears 80 of the geared architecture 48. The first control valve 76 modulates lubricant to the bearing assemblies 82 that support rotation of the gears 80. As appreciated, each of the control valves 74, 76 can be individually controlled to separately modulate lubricant to the specific features of the geared architecture 48. A third control valve 78 may also be utilized to control and modulate the flow of lubricant to other lubricated components such as the bearing assemblies 38.

It should be understood that although separate control valves are disclosed for use in modulating lubricant to the gears 80 and bearings 82, a single control valve as is shown in FIG. 1 may also be utilized to modulate and vary lubricant flow to specific features. It should also be understood that the third control valve 78 is illustrated as a single valve, but may also be comprise a plurality of valves that separately modulate lubricant flow to separate features within the engine that require lubricant.

Figure 3:
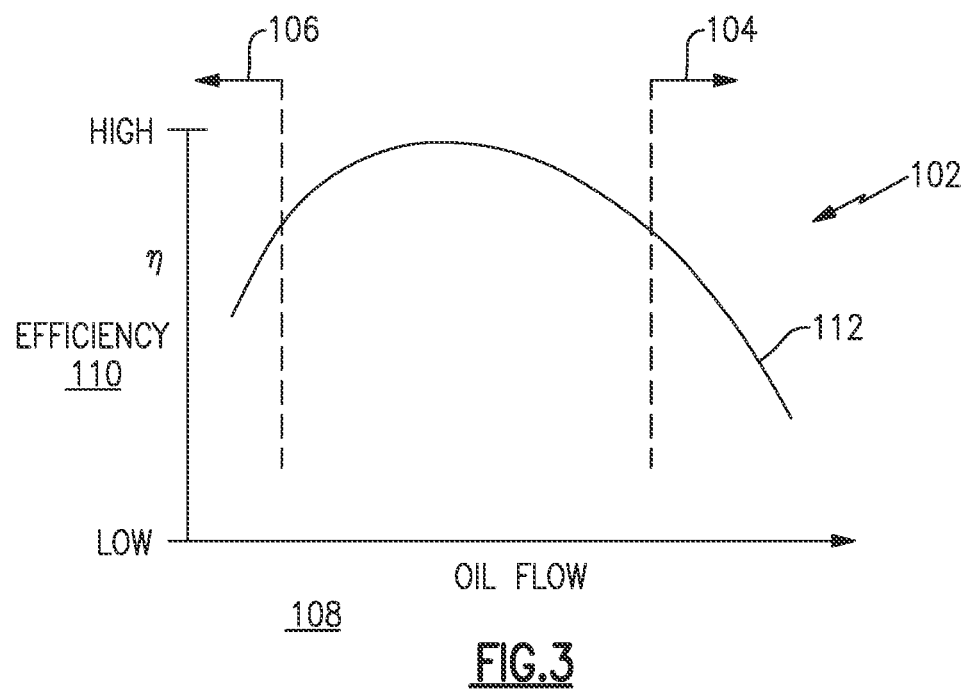
FIG. 3 is a graph illustrating a relationship between efficiency and oil flow.

Referring to FIG. 3, with continued reference to FIGS. 1 and 2, graph 102 illustrates a relationship between lubricant flow 108 to the geared architecture 48 and efficiency 110. Efficiency 110 is related to oil flow to the geared architecture 48. The line 112 indicates efficiency of the geared architecture 48 and increases as lubricant flow increases between a lower bound 106 and an upper bound 104. Lubricant flow above the upper bound 104 reduces efficiency as is indicated by the line 112. The reduced efficiency is due to excessive heat generation caused by excessive lubricant. The excessive lubricant induces windage, churning and other phenomenon that increase heat generated within the geared architecture 48 that results in the reduced overall efficiency and torque transfer.

Lubricant flow that falls below the lower bound 106 starves lubricant to the gears 80 and may result in excessive friction and damage to the interfaces between components. Accordingly, it is desirable to operate the geared architecture 48 with a lubricant flow that is within the desired operating range to provide a proper amount of lubricant that does not result in damage for the specific structures and that does not induce and cause excessive heat generation that, in turn, results in loss of efficiency.

The efficiency of the geared architecture 48 is optimal between the upper and lower bounds 106 and 104 depending on the amount of input power and torque. Accordingly, an increase in torque and horsepower transmitted through the geared architecture 48 corresponds with a higher desired lubricant flow. During maximum horsepower operating conditions, such as during maximum takeoff thrust conditions, the geared architecture requires more lubricant flow and pressure than is required at lower thrust conditions such as cruise conditions.

Conventional lubrication systems provide a minimum lubricant flow that satisfies the requirements for the maximum power conditions. As appreciated, providing a minimum flow required for maximum power conditions results in an overflow condition for all other conditions experienced during engine operation. The overflowing of lubricant results in excessive heat generation that, in turn, reduces efficiency of the geared architecture 48. This efficiency degradation caused by excessive heat results in a loss of power and also may require additional thermal management capacities to maintain the gearbox and lubricant pressures and flows within desired operational temperature ranges.

Accordingly, the example lubrication system 62 modulates lubricant to the geared architecture 48 to maintain lubricant flow within desired ranges based on current engine operating conditions and power generation.

Figure 4:
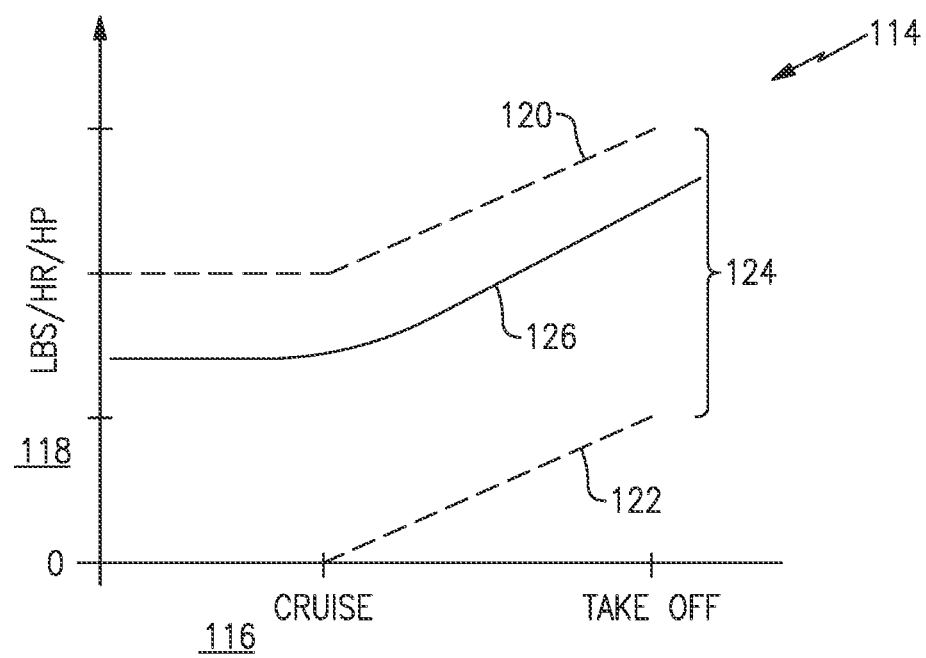
FIG. 4 is a graph illustrating the example relationship between engine power and lubricant flow.

Referring to FIG. 4, a relationship between lubricant flow 118 and engine power is illustrated by the graph 114. The desired operating range 124 includes an upper bound 120 and a lower bound 122. The upper and lower bounds 120, 122 vary depending on the operating conditions and horsepower generated by the engine 20. A desired lubricant flow level indicated at 126 is disposed within the operating range 124 and increases with engine power.

Lubricant flow 118 as indicated by the desired flow level 126 is related to engine power, indicated at 116, between a no power condition, cruise condition and maximum thrust condition at takeoff. Lubricant flow 118 is indicated by a flow parameter of pounds lubricant/hour/current engine horsepower. The pounds lubricant/hour/horsepower rating varies depending on the engine power 116 and varies to maintain the desired lubricant flow within the upper and lower bounds 120, 122 that provide the desired efficiency as is illustrated in FIG. 3.

During operation of the example turbofan engine 20, the controller 64 receives information from the first sensor 68; the second sensor 70 and the third sensor 72 that is utilized to determine a current horsepower generated by the engine 20. The engine power setting quantified through the use of horsepower is matched with a desired lubricant flow for the geared architecture 48 according to a relationship such as that illustrated in FIG. 4.

The controller 64 generates commands to control operation of the valves 74, 76 and 78 to maintain the lubricant flow within the optimal efficient bounds for each of those components. In this example, the controller 64 will control the first control valve 76 to modulate a lubricant flow 84 to the journal bearing 82. The controller 64 will also modulate and vary a control valve 74 to control lubricant flow 86 to the gears 80. The lubricant flow rate is determined with regard to the units of pounds of lubricant per hour per horsepower that is applied to the geared architecture 48.

During maximum take-off thrust conditions, as is illustrated in FIG. 4, the lubricant flow rate will be at its maximum amount to provide the geared architecture 48 with sufficient lubricant to maintain within the most efficient region illustrated in FIG. 3.

Once the aircraft has taken off and the engine thrust is reduced to a cruise thrust, the amount of lubricant required to maintain efficient operation is reduced. The controller 64 will correspondingly reduce the amount of flow that is provided to the geared architecture 48 to match the flow required to remain within the efficient regions as is indicated by FIG. 3. Throughout operation of the engine 20, the controller 64 will modulate the valve 76, 74 to provide a corresponding variation in lubricant flow 84, 86 that matches a desired and predetermined flow rate that corresponds with the specific determined engine operating condition.

Accordingly, the example lubrication system 62 and control method maintains lubricant flow within predefined efficiency limits for the geared architecture and other lubricated components. The controller 64 modulates lubricant flow based on detected engine operating conditions to maintain lubricant flow within the most efficient operating ranges.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A method of operating a lubrication system of a gas turbine engine comprising:
   determining a plurality of predefined lubricant flow rates to a first location of a speed change device and a second location within the speed change device, the plurality of predetermined lubricant flow rates corresponding to an operating condition;
   generating a signal indicative of an operating condition with at least one sensor; and
   varying each of a first lubricant flow through a first lubricant line to the first location and a second lubricant flow through a second lubricant line to the second location based on the determined plurality of predefined lubricant flow rates in response to the generated signal indicative of the sensed operating condition, wherein the first lubricant flow and the second lubricant flow are each varied independent of each other.

2. The method as recited in claim 1, wherein the plurality of predefined lubricant flow rates comprises a flow parameter of pounds lubricant/hour/horsepower.

3. The method as recited in claim 1, wherein the signal indicative of the operating condition comprises at least one of a pressure, a speed of a rotating element, and an external parameter.

4. The method as recited in claim 3, wherein the gas turbine engine includes a compressor section and the operating condition comprises a pressure at an exit of the compressor section.

5. The method as recited in claim 4, including determining horsepower transmitted through a portion of the gas turbine engine.

6. The method as recited in claim 5, wherein the signal indicative of the operating condition comprises at least one of a power setting, a pressure within the compressor section, a speed of a shaft, and an altitude.

7. The method as recited in claim 1, further comprising operating an auxiliary control valve disposed between an auxiliary pump and a main oil tank to provide lubricant flow to a primary lubricant circuit supplying lubricant to one of the first location and the second location in response to a detected loss of lubricant pressure in the primary lubricant circuit.

8. A lubrication system for a gas turbine engine comprising:
   a pump for driving lubricant through a lubrication circuit, wherein the lubrication circuit includes a first lubricant line for providing a first flow of lubricant to a first location requiring lubricant and a second lubricant line for providing a second flow of lubricant to a second location requiring lubricant;
   a speed change device, wherein the first location and the second location are part of the speed change device;
   at least one sensor for generating a signal indicative of an operating condition;
   at least one valve for controlling a flow of lubricant through the lubrication circuit to the first location and to the second location; and
   a controller for controlling operation of the at least one valve to vary the flow of lubricant based on the operating condition, wherein the controller is configured to vary each of the first flow of lubricant to the first location and the second flow of lubricant to the second location based on a plurality of predefined lubricant flow rates corresponding to the operating condition such that the first flow of lubricant to the first location and the second flow of lubricant to the second location are each varied independent of each other.

9. The lubrication system as recited in claim 8, wherein the first location comprises a bearing supporting rotation of a rotating member of the speed change device.

10. The lubrication system as recited in claim 8, wherein the second location comprises an interface between a plurality of gears of the speed change device.

11. The lubrication system as recited in claim 8, wherein the operating condition comprises horsepower generated by the gas turbine engine.

12. The lubrication system as recited in claim 11, wherein the at least one sensor comprises a first sensor for generating a signal indicative of a pressure at a location within the gas turbine engine and a second sensor for generating a signal indicative of rotational speed of a portion of the gas turbine engine.

13. The lubrication system as recited in claim 12, wherein the gas turbine engine includes a compressor section having a high-pressure compressor and a low-pressure compressor and the first sensor generates a signal indicative of a pressure proximate an outlet of the high-pressure compressor.

14. The lubrication system as recited in claim 13, wherein the controller is configured to control the at least one valve to vary the flow of lubricant to the speed change device for engine conditions between Sea Level Takeoff Thrust and a cruise condition.

15. The lubrication system as recited in claim 13, including a third valve controlled by the controller for varying a third flow of lubricant to lubricated components of the gas turbine engine other than the speed change device.

16. The lubrication system as recited in claim 12, wherein the controller is configured to control the at least one valve to vary a lubricant flow parameter of pounds of lubricant flow/hour/horsepower produced by a turbine section driving the speed change device in response to an engine power setting.

17. The lubrication system as recited in claim 8, including an auxiliary control valve disposed between an auxiliary pump and a main oil tank, wherein the auxiliary control valve provides lubricant flow to a primary lubricant circuit supplying lubricant to one of the first location and the second location in response to a detected loss of lubricant pressure in the primary lubricant circuit.

\* \* \* \* \*